United States Patent [19]

Kozuki et al.

[11] Patent Number: 4,638,390
[45] Date of Patent: Jan. 20, 1987

[54] RECORDING APPARATUS

[75] Inventors: Susumu Kozuki, Tokyo; Kenichi Nagasawa, Kanagawa; Hiroo Edakubo, Tokyo; Junichi Sato, Kanagawa; Nobutoshi Takayama, Kanagawa, all of Japan

[73] Assignee: Canon Kabushiki Kaisha, Tokyo, Japan

[21] Appl. No.: 804,350

[22] Filed: Dec. 3, 1985

[30] Foreign Application Priority Data

Dec. 4, 1984 [JP] Japan ............................ 59-256760

[51] Int. Cl.⁴ ..................... G11B 15/18; G11B 5/56
[52] U.S. Cl. ............................. 360/74.1; 360/14.1; 360/77
[58] Field of Search .................. 360/14.1, 74.1, 74.4, 360/77

[56] References Cited

U.S. PATENT DOCUMENTS 4,520,406  5/1985  Suzuki et al. ................ 360/14.2

Primary Examiner—George G. Stellar
Attorney, Agent, or Firm—Toren, McGeady & Goldberg

[57] ABSTRACT

A recording apparatus for recording an information signal on a record bearing medium comprises recording means for recording the information signal on the record bearing medium, instruction means for producing an instruction to stop a recording operation, stopping means for bringing the recording operation to a stop in response to the instruction of the instruction means, pilot signal generating means for generating pilot signals of frequencies differing from each other in a first generating pattern one after another, control means for controlling the pilot signal generating means to generate the pilot signals in a second generating pattern in response to the instruction of the instruction means, and superimposing means for superimposing upon the information signal the pilot signals generated by the pilot signal generating means.

24 Claims, 12 Drawing Figures

RECORDING APPARATUS

BACKGROUND OF THE INVENTION

1. Field of the Invention

This invention relates to a recording apparatus for recording an information signal on a record bearing medium.

2. Description of the Prior Art

Known recording and/or reproducing apparatuses of the above-stated kind include video tape recorders (hereinafter referred to as VTR's) of a rotary two-head type which is arranged, for example, to perform the so-called four-frequency pilot type tracking control. In the following description, the VTR of this kind is taken up by way of example.

In carrying out the so-called jointed recording in which a new video signal is continuously recorded on a magnetic tape without leaving any blank part after the end of a previously recorded video signal, the VTR's of this kind have employed the following method: First, when an instruction for a halt is issued, the magnetic tape is immediately wound backward to a predetermined extent (or for a given period of time "to"). Then, the tape comes to a stop. After that, when the tape is released from the stopping action, it is allowed to travel at a normal speed with the VTR shifted to a reproducing mode under tracking control. Then, after the tape is allowed to travel forward to an extent a little shorter than the above-stated backward winding extent, i.e. after the lapse of a period of time "t1" which is shorter than the period "t0", a new video signal is recorded from a part at which a recording track begins in synchronism with a head switch-over signal.

However, the conventional VTR which is arranged to be capable of performing the jointed recording in the above-stated manner has presented the following problems: First, during a period of time corresponding to a difference between the periods "t0" and "t1", there remains a portion of the previously recorded signal. Therefore, the new signal comes to be overlapped or superimposed on this portion of the previous record. As a result, the quality of a reproduced picture deteriorates in this part. Next, since the VTR of the kind performing four-frequency type tracking control is generally arranged to perform so-called azimuth overlapped writing, the locus of tracing performed by a head at the time of reproduction deviates from that of tracing performed by a head in recording. Therefore, with the tape wound backward after the halt as mentioned above, the arrangement to record a new video signal with tracking made in the same manner as the reproduction tracking made at the time of the halt would result in the irregular width of tracks formed in the joint part. Therefore, when the jointed record is played back across the jointed part, tracking cannot be stably accomplished at that part.

To solve these problems, there have been contrived various methods. In one of such methods, a VTR is arranged to lessen the overlapped recording part. In another, a VTR is arranged to compensate for the deviation of the tracing locus of the head. These methods, however, necessitate additional arrangement of high precision control means. Therefore, each of these methods has resulted in a complex circuitry, which has hindered reduction in size and cost of the apparatus.

SUMMARY OF THE INVENTION

It is an object of this invention to provide a recording apparatus which is capable of indicating the end part of a record on a record bearing medium without necessitating any complex arrangement for that purpose.

It is another object of this invention to provide a recording apparatus which is capable of indicating a stopped part of a recording operation on a record bearing medium without producing any additional signal for indicating.

It is a further object of this invention to provide a recording apparatus which is capable of detecting a part at which a recording operation is stopped on a record bearing medium and to automatically switch one operating mode over to another without necessitating any complex arrangement.

It is a still further object of this invention to provide a recording apparatus which is capable of stopping a recording operation after a predetermined number of recording tracks are formed on a record bearing medium without necessitating any complex arrangement for that purpose.

Under these objects, a recording apparatus arranged according to this invention to record an information signal on a record bearing medium comprises: recording means for recording the information signal on the medium; instruction means for producing an instruction to stop a recording operation; stopping means for causing, in response to the instruction of the instruction means, the recording means to stop recording; pilot signal generating means for generating pilot signals having different frequencies from each other in a first generating pattern; control means for controlling the pilot signal generating means to generate the pilot signals in a second generating pattern in response to the instruction of the instruction means; and superimposing means for superimposing upon the information signal the pilot signals generated by the pilot signal generating means.

The above and other related objects and features of this invention will become apparent from the following detailed description of embodiments thereof taken in connection with the accompanying drawings.

DETAILED DESCRIPTION OF THE PREFERRED EMBODIMENTS

Figure 1:
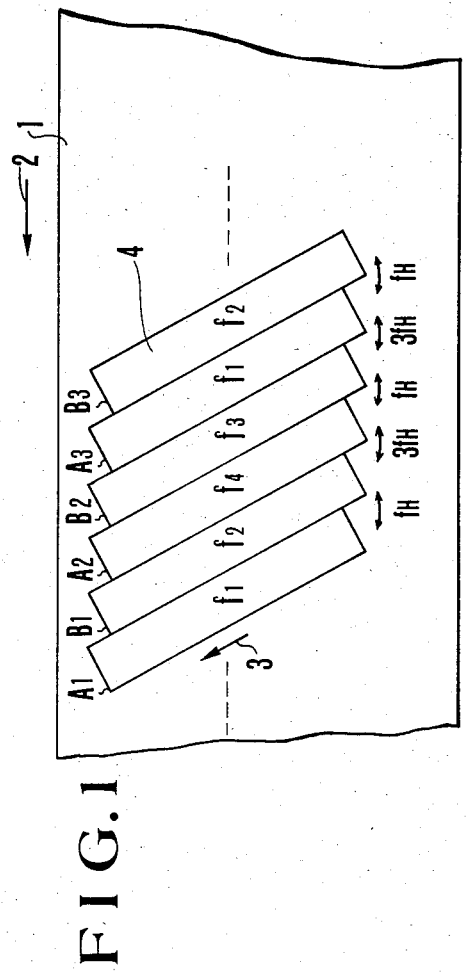
FIG. 1 is an illustration of magnetized recording tracks formed by a VTR of the type performing tracking control by the four-frequency pilot method.
Figure 2:
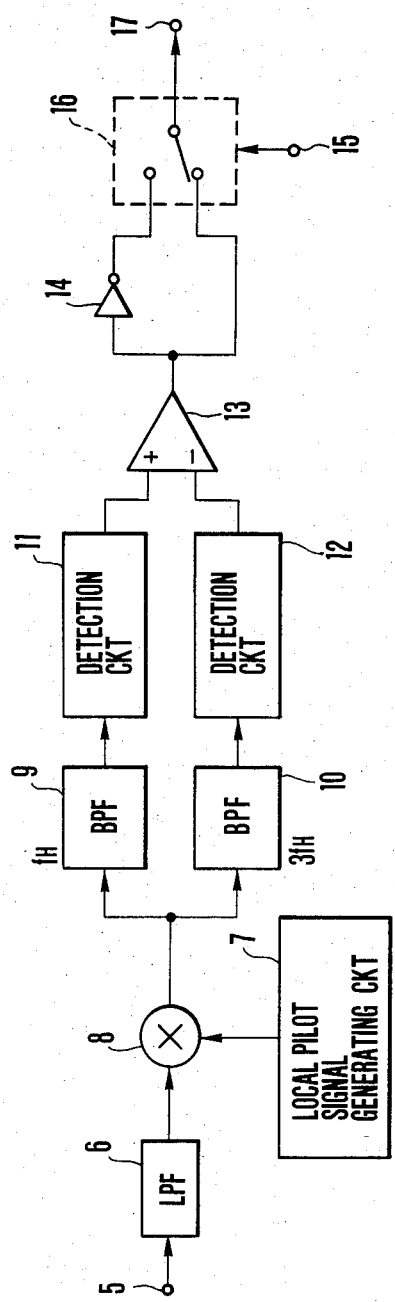
FIG. 2 is a block diagram showing the essential parts of a reproduction circuit arranged to obtain a tracking error signal.

The details of this invention will be understood from the following description of a preferred embodiment thereof: First, let us briefly describe the manner in which a tracking control signal is obtained by the four-frequency pilot method. FIG. 1 of the accompanying drawings shows the magnetized recording tracks formed by a VTR of the kind performing tracking control in accordance with the four-frequency pilot method. FIG. 2 is a block diagram showing the essential parts of a reproduction circuit arranged to obtain the tracking error signal.

Referring to FIG. 1, the illustration includes a magnetic tape 1 and an arrow 2 which indicates the travelling direction of the tape 1. Recording tracks A1, B1, A2, B2, . . . are formed with recording performed by heads A and B which have different predetermined azimuth angles. An arrow 3 indicates a direction in which scanning is performed by these heads. In each of recording tracks 4, one of pilot signals having four different frequencies f1 to f4 is recorded along with a video signal. The pilot signals are thus superimposed on a video signal one after another for every field portion of the record (one in every track). The recording sequence of these pilot signals is, for example, as follows as shown in FIG. 1: The track A1 has the pilot signal of the frequency f1 which is, for example, $102.5 \text{ KHz} \approx 6.5 \text{ fH}$ (fH representing the frequency of a horizontal synchronizing signal). The track B1 has the pilot signal of the frequency f2 which is, for example, $118.9 \text{ KHz} \approx 7.5 \text{ fH}$. The track A2 has the pilot signal of the frequency f4 which is, for example, $165.2 \text{ KHz} \approx 10.5 \text{ fH}$. The track B2 has the pilot signal of the frequency f3 which is, for example, $148.7 \text{ KHz} \approx 9.5 \text{ fH}$. The frequency difference between the pilot signals recorded in adjacent recording tracks is arranged to be either fH or 3 fH as shown in FIG. 1. Further, when the head is scanning a track Ai (i: 1, 2, 3, . . . ), the frequency difference between the pilot signal of the track and that of another track which is located next on the right-hand side of the track Ai as viewed on the drawing is always fH while the frequency difference between the pilot signal of the track Ai and that of another track on the left-hand side thereof is always 3 fH. When the head is scanning a track Bi (i: 1, 2, 3, . . . ) on the other hand, the frequency difference between the pilot signal of the track and that of another track on the right-hand side is always 3 fH while the frequency difference between the pilot signal of the track Bi and that of another track on the left-hand side is always fH.

Further, since the pilot signals of the frequencies f1 to f4 are relatively low frequency signals, the head can reproduce the pilot signals of the adjacent tracks as cross-talks in addition to that of the track being mainly scanned even in the case of azimuth recording arrangement. In other words, assuming that the head is mainly scanning the track A2, a composite signal including components of frequencies f4, f2 and f3 is detected as the pilot signal. In case that the center of the tracing locus of the head accurately coincides with the center line of the mainly scanned track, i.e. in the case of an on-track condition, the reproduced level of the pilot signal of frequency f2 and that of the pilot signal of frequency f3 are equal to each other. The letter becomes higher than the former when the position of the head deviates from the track A2 slightly toward the track B2. The former becomes higher than the latter when the head deviates slightly toward the track B1.

To obtain the direction and the degree of deviation of the head from the mainly scanned track, difference signals of fH and 3 fH representing the frequency difference between the pilot signal of the main track and that of each of the two adjacent tracks are separated and taken out; and then the levels of the two difference signals are compared with each other.

FIG. 2 is a circuit block diagram showing the arrangement of a circuit operating in accordance with the four-frequency pilot method described above. Referring to FIG. 2, a terminal is arranged to receive an incoming reproduced signal having the pilot signals superimposed on a video signal. The reproduced signal is applied to a low-pass filter (hereinafter referred to as LPF) 6 to have the pilot signal component separated alone. A multiplier 8 is arranged to perform a multiplying operation on the separated pilot signal component and a local pilot signal generated by a local pilot signal generating circuit 7. The local pilot signal is arranged to have the same frequency as that of the pilot signal recorded in the mainly scanned track. As mentioned in the foregoing with reference to FIG. 1, in case that the track A2 is being mainly scanned, the output of the LPF 6 includes components of frequencies f2, f4 and f3. Then, the frequency of the local pilot signal in this instance is f4. Accordingly, the multiplier 8 produces a signal having a frequency of a sum of and difference frequencies f2, f4 and f3 and the frequency f4 in this instance. A band-pass filter (hereinafter referred to as BPF) 9 is arranged to take out the frequency component fH from the sum and difference signal. Another BPF 10 is arranged to take out the frequency component 3 fH from the signal. The outputs of the BPF's are supplied to detection circuits 11 and 12 for detection and rectification.

Following this, the signal components fH and 3 fH are supplied to a level comparator 13. The circuit 13 then produces a signal corresponding to the level difference between these signal components. More specifically, when the reproduced level of the signal component fH is higher than that of the signal component 3 fH, a positive potential corresponding to the level difference is taken out. In the event of a converse relation, a negative potential is taken out. This arrangement thus gives a signal indicative of both the degree and the direction of the deviation of the head from the track. Therefore, this signal is usable as a tracking error signal.

Then, since the relation of the deviating direction of the head to the tracking error signal for the track Ai conversely takes place in the case of the track Bi as described in the foregoing, a switching circuit 16 is arranged to selectively allow the output of the comparison circuit 13 to pass through an inverting amplifier 14 in response to a head switch-over signal 15.

Figure 3A:
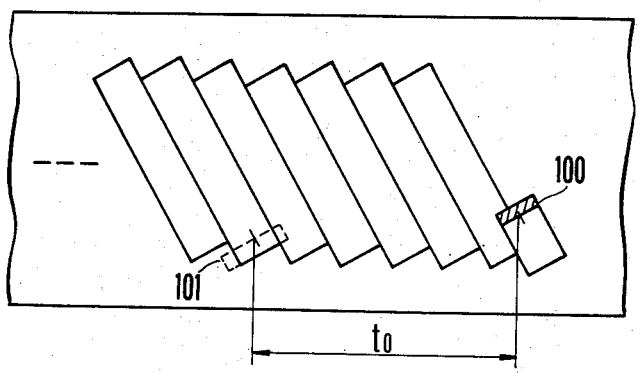
FIGS. 3A, 3B and 3C are illustrations showing the shortcoming of the jointed recording performed by the conventional VTR.
Figure 3B:
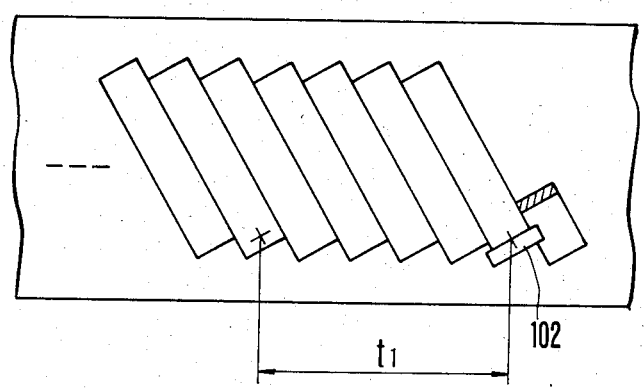
Figure 3C:
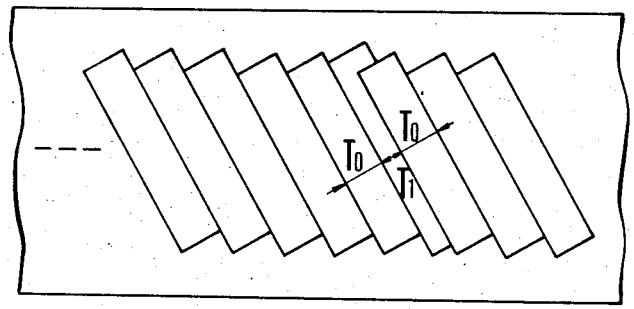

FIGS. 3A, 3B and 3C show the shortcoming of the conventional jointed recording arrangement. Assuming that a halt or stop instruction is produced to temporarily stop recording when either the head A or the head B (or a head 100) is recording halfway for one field portion of the signal as shown in FIG. 3A, the tape is then wound backward to a predetermined extent "t0" and the head 100 comes back to a point 101.

After that, there obtains a reproducing mode with the halt mode cancelled. Then, the tape is allowed to travel at a normal speed under tracking control. There obtains a recording mode in synchronism with a head switch-over signal produced after the lapse of a period of time t1 (shorter than the period of time t0). The head then records a new signal at a point 102 indicated in FIG. 3B. Before arrival at this point 102, the head has traced the tape across three tracks under tracking control. Therefore, if the recording mode obtains immediately under that condition, there would be formed a recording track of width T1 which is narrower than the width T0 of other recording tracks as shown in FIG. 3C. This has been the shortcoming of the conventional arrangement for jointed recording.

Figure 4:
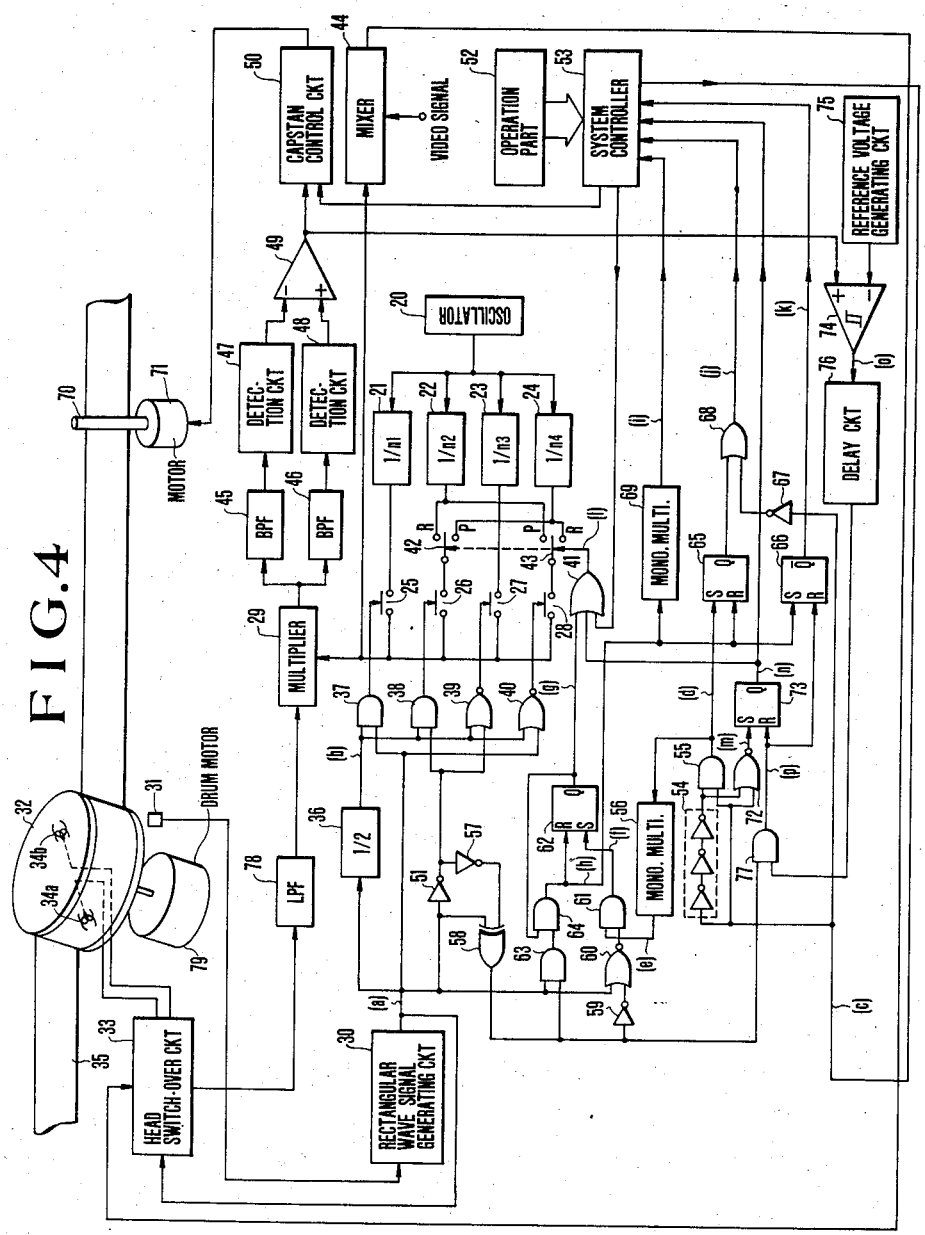
FIG. 4 is a diagram showing the arrangement of essential parts of a VTR embodying this invention as an ebodiment thereof.

A VTR which is arranged according to this invention as an embodiment thereof is arranged as shown in FIG. 4 in a circuit diagram. FIGS. 5A to 5E show the operation of this embodiment. FIG. 6 shows the wave forms of signals obtained at various parts of the circuit arrangement of FIG. 4. The details of this embodiment will be described below with reference to these drawings:

Referring to FIG. 4, an oscillator 20 produces a reference signal, which is then frequency divided by 1/n1, 1/n2, 1/n3 and 1/n4 by means of frequency dividers 21, 22, 23 and 24. These frequency dividers 21, 22, 23 and 24 then produces signals of frequencies f1, f2, f4 and f3. One of these signals of frequencies f1, f2, f4 and f3 is selectively supplied to a multiplier 29 with one of switches 25, 26, 27 and 28 turned on. Meanwhile, a rectangular wave signal generating circuit 30 is arranged to produce a rectangular wave signal which is as shown at a part (a) in FIG. 6. This rectangular wave signal (a) alternately becomes high and low levels at every one-field period (at intervals of 1/60 sec) according to the rotation phase of a rotary drum 32 detected by a detector 31. This signal is arranged to be used also as a head switch-over signal HSW and is thus supplied to a head switch-over circuit 33. The magnetic head operation is thus switched over between heads 34a and 34b. The inversion period of this signal HSW corresponds to a period of time during which the magnetic head 34a or 34b traces one recording track on the magnetic tape 35.

The signal HSW or (a) is frequency divided by ½ by a ½ frequency divider 36 to obtain a signal (b) as shown at a part (b) in FIG. 6. As a result of this, each of AND gates 37 and 38 and NOR gates 39 and 40 produces a high level signal one after another at every one-field period (a period of time during which each of the magnetic heads 34a and 34b traces one recording track).

Meanwhile, as will be described in detail later, the output level of an OR gate 41 becomes low for normal recording and high for normal reproduction. When the output of this OR gate 41 is at a high level, the connecting positions of switches 42 and 43 are on their sides P. They are on the other sides R when the output of the OR gate 41 is at a low level. During normal recording, therefore, one of pilot signals of the frequencies f1, f2, f3 and f4 is supplied to a mixer 44 at every one-field period in a sequence of rotation of f1, f2, f4 and f3. The mixer mixes the pilot signal with an incoming video signal. The output of the mixer 44 is recorded on a magnetic tape 35 by the magnetic heads 34a and 34b. Further, during normal reproduction, signals of frequencies f1, f2, f3 and f4 are supplied one after another in rotation to a multiplier 29 in the sequence of f1, f3, f4 and f2 as local pilot signals. Then, a reproduced signal obtained from the magnetic heads 34a and 34b is supplied to the multiplier 29 via the head switch-over circuit 33 and a low-pass filter 78. The reproduced signal and the local pilot signal are subjected to a multiplying operation performed by the multiplier 29.

In case that a normal reproducing operation is designated at an operation part 52 and a reproducing instruction signal of a high level is supplied to the OR gate 41 from a system controller 53, if the frequencies of the pilot signals recorded in the main tracks are in the sequence of f1, f2, f4 and f3, the frequencies of the local pilot signals supplied to the multiplier 29 are in the sequence of f1, f3, f4 and f2. Therefore, in this instance, the frequency difference between each of the local pilot signals and the pilot signal recorded in the track preceding the main track is always 3 fH while the frequency difference between the local pilot signal and the pilot signal of the track succeeding the main track is always fH. These frequency components fH and 3 fH are separated by means of band-pass filters 45 and 46 and the detection circuits 47 and 48. Then, a comparison circuit 49 produces a signal corresponding to a difference between the outputs of the detection circuits 47 and 48. The signal from the comparison circuit 49 is employed as a tracking error signal as it is and is supplied to a capstan control circuit 50. The oscillator 20, frequency dividers 21, 22, 23 and 24, the AND gates 37 and 38, the NOR gates 39 and 40, the ½ frequency divider 36 and the inverter 51 jointly form the local pilot signal generating circuit 7 shown in FIG. 2.

In the event of jointed recording, the embodiment operates as follows: When a normal recording operation is designated at the operation part 52, a recording instruction signal which is at a low level is supplied from the system controller 53 to the OR gate 41. The switches 42 and 43 are connected to their sides R. Under that condition, a stop or halt is designated at the operation part 52. The system controller 53 then produces a halt instruction signal which remains at a high level while recording is brought to a stop as shown at a part (c) of FIG. 6. This signal is supplied to an OR gate 68 via a delay inversion circuit 54, an AND gate 55 and an inverter 67. The delay inversion circuit 54 and the AND gate 55 are provided for the purpose of detecting the rising edge of the recording stop instruction signal (c). An edge signal (d) which is thus obtained triggers a monostable multivibrator 56. The output of the monostable multivibrator 56 becomes a signal which remains at a high level between two fields in a manner as shown at a part (e) of FIG. 6.

Meanwhile, edge parts of the signal HSW or (a) are detected by inverters 51 and 57 and an exclusive OR circuit 58. Further, an inverter 59 and a NOR gate 60 detect only the fall edge of the signal. As a result, one edge of the signal is gated by an AND gate 61 as a pulse signal (f). This pulse signal (f) comes to set a flip-flop 62. The flip-flop 62 is reset by a next rise edge (h) of the signal HSW or (a) which is detected via AND gates 63 and 64. The flip-flop 62 then produces a signal (g) as the Q output thereof as shown at a part (g) in FIG. 6. The level of the signal (g) is at a high level for a one-field period during which the pilot signal of the frequency f2 or f3 is recorded for the first time after the recording stop instruction is produced. During that period, the level of the output (l) of the OR gate 41 is also high as shown at a part (l) in FIG. 6. Then, if the track is to be recorded with the pilot signal of the frequency f2 or f3, the frequency of the pilot signal to be recorded becomes f3 or f2.

Figure 5A:
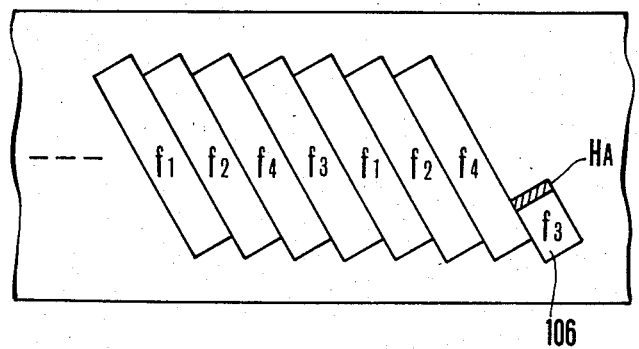
FIGS. 5A to 5E are illustrations showing the operation of the VTR of FIG. 4.
Figure 6:
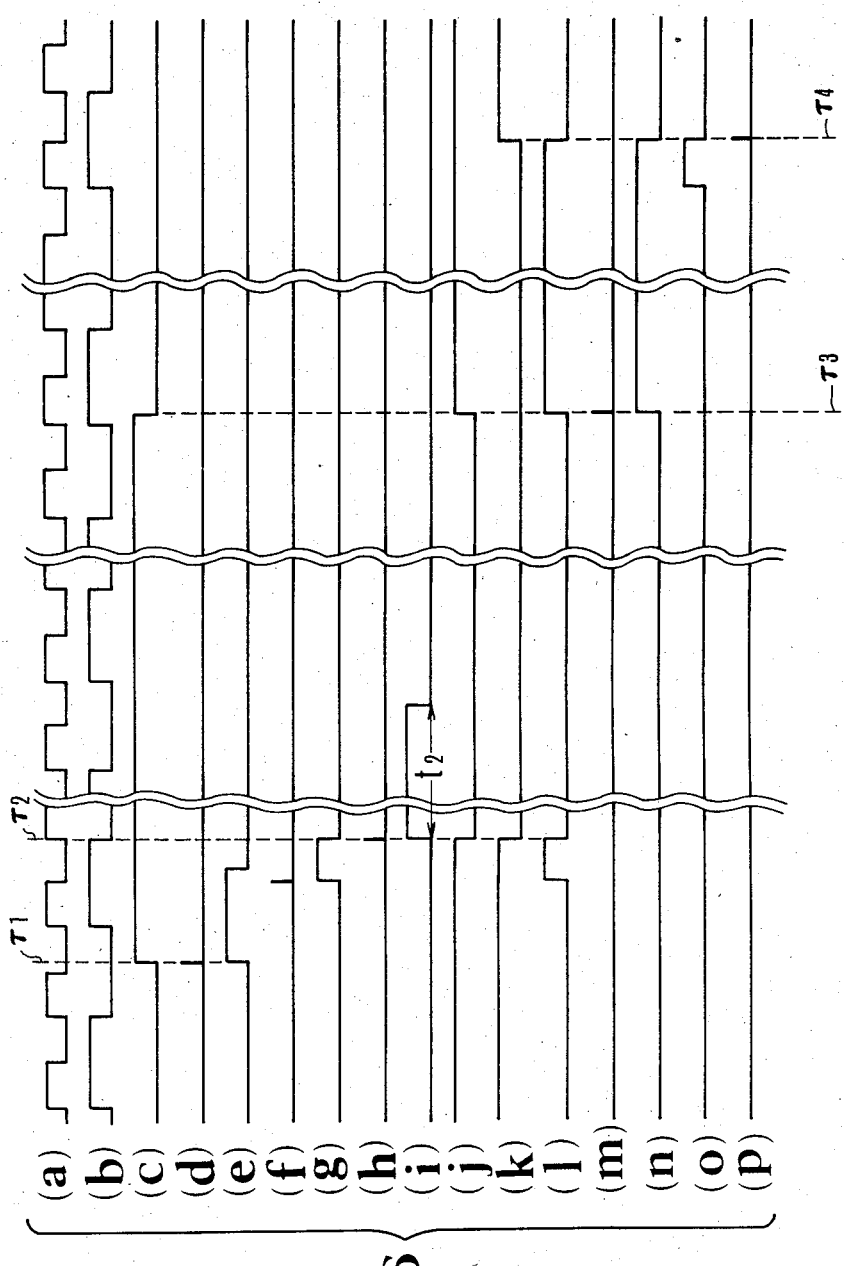
FIG. 6 is a timing chart showing the wave forms of signals produced from various parts of the VTR shown in FIG. 4.

Let us assume that a recording stop instruction is produced under a condition as represented by FIG. 5A. In other words, the recording stop instruction is produced while a head HA is in the process of tracing a track 106. In such a case, the recording operation cannot be immediately brought to a halt at that point of time (i.e. a point of time T1 shown in FIG. 6), because:

an instruction signal (j) applied to the system controller 53 during the recording operation is kept at a high level with a flip-flop 65 having been set. Besides, a video signal recording instruction (k) also remains at a high level as a flip-flop 66 is not triggered.

Figure 5B:
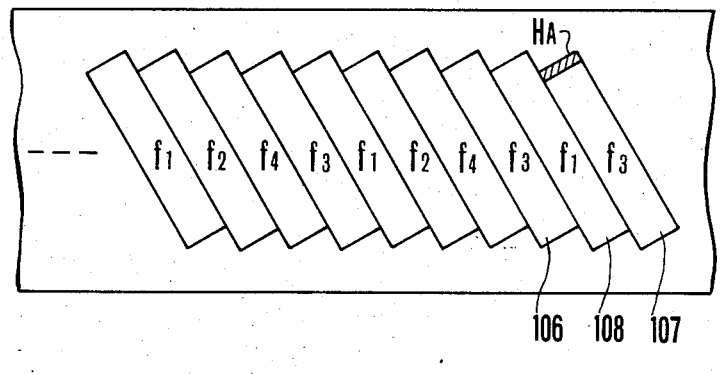

Referring to FIG. 5B, when the head HA traces a track 107, the level of the output (l) of the OR gate 41 becomes high. Therefore, both the switches 42 and 43 are connected to their sides P. Then, in place of the pilot signal of the frequency f2 which is to be recorded, the pilot signal of the frequency f3 is recorded. The recording operation then comes to a stop when the head HA comes to a position as indicated in FIG. 5B.

At this point of time (T2 in FIG. 6), the flip-flop 62 is reset. The reset pulse (h) also resets the flip-flop 65 and sets a flip-flop 66. A monostable multivibrator 69 is triggered. Then, a capstan reverse rotating instruction signal (i) which is supplied from this monostable multivibrator to the system controller 53 becomes a high level. This high level signal (i) is supplied via the system controller 53 to a capstan control circuit 50. Upon receipt of this signal, the capstan control circuit 50 controls a capstan motor 71 which is arranged to drive a capstan 70. The capstan 70 is then driven to begin to rewind (or wind backward) the magnetic tape 35. This tape rewinding action comes to a stop after the lapse of a predetermined period of time as indicated at "t2" in FIG. 6. The magnetic tape comes to a stop accordingly.

Figure 5C:
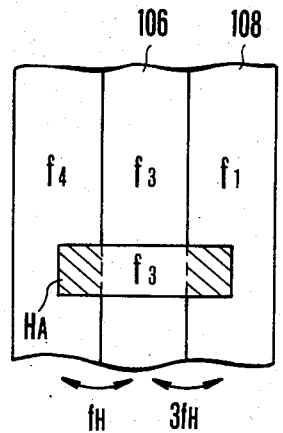
Figure 5D:
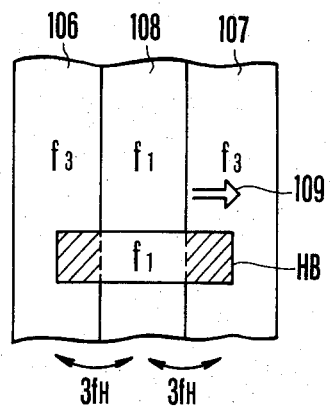
Figure 5E:
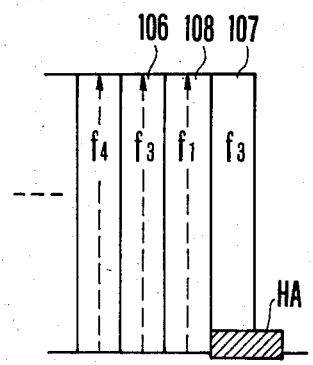

In case that the recording is to be resumed with the recording stop instruction cancelled, the embodiment operates as follows: Assuming that a recording resuming instruction is produced at a point of time T3 as shown in FIG. 6, the level of the recording stop instruction signal (c) becomes a low level. The fall edge of the signal (c) is detected by a NOR gate 72 as shown at a part (m) in FIG. 6. A flip-flop 73 is set by this. The level of the Q output (n) of the flip-flop 73 becomes high. The high level signal (n) is then supplied to the system controller 53 as a reproducing instruction signal. Further, the level of the output (l) of the OR gate 41 also becomes high. As a result, the frequency rotation sequence of the local pilot signals becomes f1, f3, f4 and f2. Then, a reproducing operation begins on the rewound (or wound back) portion of the magnetic tape. Referring now to FIG. 5C, in the record part mentioned above, the frequency component of 3 fH is obtained from a preceding track and the frequency component of fH from a succeeding track until the head comes to trace a track 106 which is located in the third place counting from the last recording track. The head HA then comes to be in an on-track state at that point of time. Referring to FIG. 5D, when the head HB traces a track 108 located second from the last track, the tracking error signal is obtained in the following manner: In this instance, frequency components of 3 fH are obtained as cross-talk components from the pilot signals recorded in both the tracks preceding and succeeding the mainly traced track. Therefore, when the head HB begins to trace the track 108, the level of the tracking error signal produced from the comparison circuit 49 of FIG. 4 suddenly rises. This urges the travelling speed of the magnetic tape to be increased to shift the position of the head HB in the direction of arrow 109 as indicated in FIG. 5D. Following this, when the head HA comes to begin to trace the last track 107, the position of one end of the head HA approximately coincides with the border line between the tracks 107 and 108.

While the head HB is mainly tracing the track 108, any abnormality of the tracking error signal is detected with the signal compared by a hysteresis comparator 74 with a reference voltage produced from a reference voltage generating circuit 75. Further, in the event of detection of any abnormality during this period, an abnormality detection signal (o) is obtained in a manner as shown at a part (o) in FIG. 6. The fall edge of this signal (o), that is, a point of time T4 (see FIG. 6) at which the tracing action on the track 108 by the head HB comes to an end is detected by an AND gate 77 which receives a signal obtained by slightly delaying the abnormality detection signal (o) via a delay circuit 76 and an edge of the signal HSW or (a) as shown at part (p) in FIG. 6.

The timing pulse (p) which is thus obtained resets the flip-flop 66 and another flip-flop 73. With these flip-flops reset, recording is resumed by bringing the reproduction of a vide signal to a stop. Since the level of the Q output (n) of the flip-flop 73 changes to a low level, the level of the output (l) of the OR gate 41 also becomes low. As a result the rotation sequence of frequencies of the pilot signals comes back to the sequence of f1→f2→f4→f3. Then, in the track 107, recording is performed with the pilot signal of the frequency f2 superimposed upon a video signal.

As obvious from the description given above, the overlapped writing part which is obtained by the VTR according to this invention is limited to only one-field portion of the video signal (one track). Besides, the width of tracks in the jointed part of the signal is unvarying. Therefore, the embodiment is capable of carrying out a continuous reproducing operation without deterioration of picture quality and unstable travel of the magnetic tape. It is another advantage of the embodiment that the above-stated advantages are attainable by just generating pilot signals in frequency rotation in the same sequence as in normal recording and reproduction. The invented arrangement thus dispenses with such arrangements as a time counting circuit and a last track detection signal generating circuit that have been indispensable for jointed recording by the conventional VTR's.

What is claimed is:

1. A recording apparatus for recording an information signal on a record bearing medium, comprising:
    (a) recording means for recording said information signal on said record bearing medium;
    (b) instruction means for producing an instruction to stop a recording operation;
    (c) stopping means for bringing said recording operation to a stop in response to the instruction of said instruction means;
    (d) pilot signal generating means for generating pilot signals of frequencies differing from each other in a first generating pattern one after another;
    (e) control means for controlling said pilot signal generating means to generate the pilot signals in a second generating pattern in response to the instruction of the instruction means; and
    (f) superimposing means for superimposing upon said information signal said pilot signals generated by said pilot signal generating means.

2. A recording apparatus according to claim 1, wherein said stopping means includes:
    (a) synchronous signal generating means for generating a synchronous signal synchronized with the recording operation of said recording means;

(b) recording stop signal generating means for generating a recording stop signal by detecting an edge of said synchronous signal after receipt of said instruction from said instruction means; and (c) recording operation stopping means for bringing the recording operation of said recording means to a stop upon receipt of said recording stop signal.

3. An apparatus according to claim 1, wherein said pilot signal generating means includes:

(a) reference signal generating means for generating a reference signal;

(b) frequency dividing means for producing a plurality of pilot signals of different frequencies by dividing said reference signal; and (c) selecting means for selecting the outputs of said frequency dividing means one after another based on the first generating pattern.

4. An apparatus according to claim 3, wherein said selecting means is arranged to normally select the outputs of said frequency dividing means one after another in the first generating pattern in synchronism with the recording operation of said recording means.

5. An apparatus according to claim 3, wherein said control means is arranged to change the selecting sequence of said selecting means to the second generating pattern.

6. An apparatus according to claim 1, further comprising:

(a) reproducing means for reproducing from said record bearing medium the signals recorded by said recording means on said record bearing medium;

(b) tracking error signal generating means for generating a tracking error signal by using pilot signals reproduced by said reproducing means;

(c) detecting means for detecting any abnormality of said tracking error signal by monitoring said tracking error signal; and (d) starting means for causing said recording means to begin recording when an abnormality of said tracking error signal is detected by said detecting means.

7. An apparatus according to claim 6, wherein said detecting means includes reference voltage generating means for generating a reference voltage and comparison means for comparing said tracking error signal with the reference voltage produced from said reference voltage generating means.

8. A recording and reproducing apparatus for recording an information signal on a record bearing medium and for reproducing said signal from said medium, comprising:

(a) recording and reproducing means for recording and reproducing said information signal on and from said record bearing medium;

(b) instruction means for producing an instruction for causing said recording and reproducing means to stop performing a recording operation thereof;

(c) stopping means for bringing the recording operation of said recording and reproducing means to a stop upon receipt of the instruction of said instruction means;

(d) pilot signal generating means for generating in a predetermined sequence of rotation one after another pilot signals of four different frequencies;

(e) control means, responsive to the instruction of said instruction means, for controlling said pilot signal generating means to cause said pilot signals to be generated in rotation in a sequence reverse to said predetermined sequence of rotation;

(f) superimposing means for superimposing upon said information signal said pilot signals generated by said pilot signal generating means; and (g) tracking error signal generating means for generating a tracking error signal by using pilot signals reproduced by said recording and reproducing means and pilot signals generated by said pilot signal generating means in rotation in a sequence reverse to the predetermined sequence of rotation.

9. An apparatus according to claim 8, wherein said stopping means includes:

(a) synchronous signal generating means for generating a rectangular wave synchronous signal synchronized with the recording operation of said recording and reproducing means;

(b) recording operation stop signal generating means, upon receipt of a recording stop instruction from said instruction means, for detecting an edge of said synchronous signal and producing a recording operation stop signal when a next edge of said synchronous signal is detected; and (c) recording operation stopping means for stopping the recording operation of said recording and reproducing means in response to said recording operation stop signal.

10. An apparatus according to claim 8, wherein said pilot signal generating means includes:

(a) reference signal generating means for generating a reference signal; and (b) selecting means for selecting one by one in the predetermined sequence of rotation pilot signals of four different frequencies which are obtained by dividing the frequency of said reference signal.

11. An apparatus according to claim 10, wherein said control means is arranged to cause said selecting means to make selection of said pilot signals in the sequence reverse to said predetermined sequence of rotation.

12. An apparatus according to claim 8, wherein said recording and reproducing means is arranged to trace the surface of said record bearing medium.

13. An apparatus according to claim 12, further comprising: tracking control means for controlling the tracing action of said recording and reproducing means according to said tracking error signal generated by said tracking error signal generating means.

14. A video tape recorder for recording a video signal, comprising:

(a) a rotary magnetic head arranged to record and reproduce a video signal on and from a magnetic recording tape;

(b) instruction means for producing an instruction to bring the recording operation of said video tape recorder to a stop;

(c) synchronous signal generating means for generating a synchronous signal synchronized to the rotating period of said rotary magnetic head;

(d) pilot signal generating means for generating tracking control pilot signals of four different frequencies in synchronism with the synchronous signal generated by said synchronous signal generating means, said pilot signal generating means being arranged to produce said pilot signals of different frequencies in a predetermined sequence of rotation one after another;

(e) control means for controlling said pilot signal generating means, when a recording stop instruction is produced from said instruction means, to cause said pilot signal generating means to produce a pilot signal which is of the same frequency as a preceding pilot signal produced two steps before a pilot signal to be next produced;

(f) superimposing means for superimposing upon said video signal the pilot signals generated by said pilot signal generating means; and (g) tracking error signal generating means for generating a tracking error signal by using the pilot signals reproduced by said rotary magnetic head;

(h) tracking control means for controlling the magnetic tape tracing action of said rotary magnetic head according to said tracking error signal; and (i) command signal generating means for generating a command signal to switch the operating mode of said video tape recorder from one mode over to another upon detection of an abnormality of said tracking error signal by monitoring the tracking error signal.

15. A video tape recorder according to claim 14, wherein said synchronized signal generating means is arranged to generate a rectangular wave signal the phase of which is inverted according to the rotating period of said rotary magnetic head.

16. A video tape recorder according to claim 15, wherein said pilot signal generating means is arranged to produce said pilot signals of four different frequencies by switching one of them over to another in a predetermined sequence of rotation every time an edge part of said rectangular wave signal is detected.

17. A video tape recorder according to claim 15, wherein said control means is arranged to produce, upon detection of an edge part of said rectangular wave signal after said recording stop instruction is produced from said instruction means, a pilot signal which is of the same frequency as a pilot signal produced upon previous detection of an edge part occurred two edge parts before.

18. A video tape recorder according to claim 14, wherein said tracking control means includes tape moving extent control means for controlling an extent to which said magnetic tape is to be moved according to said tracking error signal.

19. A video tape recorder according to claim 14, wherein said command signal generating means includes reference voltage generating means; and detecting means for comparing a reference voltage signal produced from said reference voltage generating means with said tracking error signal and detecting an abnormality of said tracking error signal through this comparison.

20. A recording apparatus for recording an information signal on a record bearing medium, comprising:

(a) recording means for forming recording tracks by recording said information signal on said record bearing medium;

(b) synchronous signal generating means for generating a synchronous signal in accordance with the recording track forming action of said recording means;

(c) instruction means for producing a recording stop instruction to bring the recording operation of said recording apparatus to a stop; and (d) stopping means for detecting said synchronous signal and, upon completion of formation of a predetermined number of said recording tracks, after the instruction of said instruction means is produced, to cause the recording operation of said recording means to come to a stop.

21. An apparatus according to claim 20, wherein said synchronous signal generating means is arranged to generate a rectangular wave signal in synchronism with the recording track forming action of said recording means.

22. An apparatus according to claim 21, wherein said stopping means includes (a) a recording operation stop signal generating means, which is arranged to receive the instruction from said instruction means, for generating a recording operation stop signal upon detection of an edge part of said rectangular wave signal after receipt of said instruction; and (b) recording operation stopping means for bringing the recording operation of said recording means to a stop upon receipt of said recording operation stop signal.

23. An apparatus according to claim 22, further comprising:

(a) pilot signal generating means for generating a plurality of pilot signals having different frequencies from each other, said different pilot signals being produced one by one in a predetermined sequence of rotation;

(b) superimposing means for superimposing upon said information signal said pilot signals generated from said pilot signal generating means; and (c) control means for controlling said superimposing means to superimpose a pilot signal of the same frequency as that of a pilot signal which is superimposed on a recording track preceding by two tracks on a recording track formed immediately before the recording operation is brought to a stop by said stopping means.

24. An apparatus according to claim 23, wherein said control means includes switch-over means responsive to said recording operation stop signal for switching said predetermined sequence of rotation in which said pilot signals are produced from said pilot signal generating means over to a sequence reverse to said predetermined sequence.

* * * * *